UNITED STATES PATENT OFFICE.

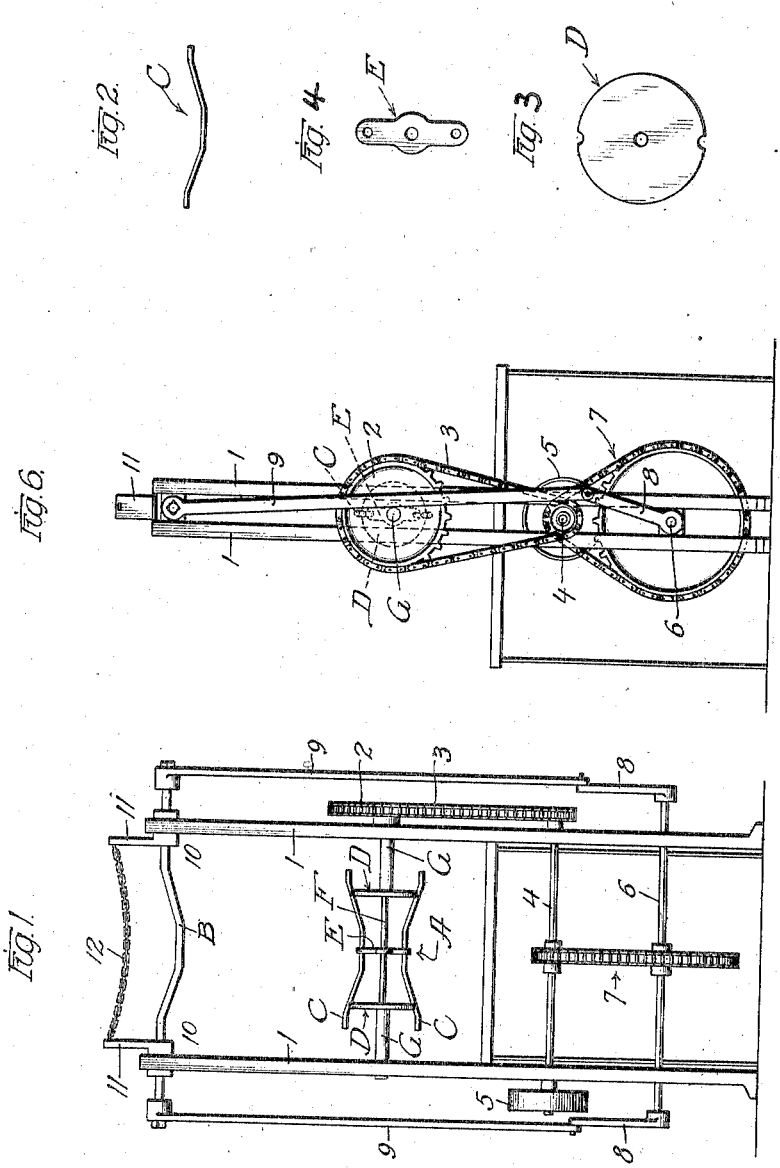

HARVEY P. SPENCER, OF CHICAGO, ILLINOIS.

CANDY-PULLING MACHINE.

1,249,847.  Specification of Letters Patent.  Patented Dec. 11, 1917.

Application filed December 22, 1916. Serial No. 138,390.

*To all whom it may concern:*

Be it known that I, HARVEY P. SPENCER, a citizen of the United States, residing at Chicago, county of Cook, and State of Illinois, have invented a new and useful Candy-Pulling Machine, of which the following is a specification.

My invention relates to improvements in candy pulling machines, in which a revolving candy spool operates in conjunction with a reciprocating hook and chain; and the objects to be attained are, first, to produce a machine of more simple construction and higher efficiency, and second, to improve the coiling process of pulling candy.

To attain these objects I use mechanism illustrated in the accompanying drawings in which Fig. 1 is an upright front view of the machine and Figs. 2, 3, 4, and 5, show separate parts of the candy spool. Fig. 6 is a side elevation. Similar numerals and letters refer to different parts for the purpose of full illustration.

The candy spool is shown in Fig. 1 at A, and the reciprocating hook and chain are shown at B. The candy spool A, is made up of two or more longitudinally disposed sections C, C, of comparatively small diameter, bent as shown separately in Fig. 2, which are held in place by two spool ends D, D, Fig. 1, (side view Fig. 3). The sections C C are passed through cross piece E, (side view of E shown by Fig. 4), and inserted in grooves in spool ends D D. Also center rod F, which has a shoulder cut on each end and each end threaded, (shown separately Fig. 5), is passed through cross piece E at its center the two being welded together or otherwise firmly attached and also passed through center of spool ends D D. End shafts G G, are bored and threaded to fit threads on ends of center rod F, which when screwed in place firmly grip spool ends D D, making the spool rigid, as well as completing a strong and true shaft through the candy spool, by means of which the spool is rotated. The shafts G G rotate in stationary bearings in uprights 1, 1, and are driven by sprocket 2, meshing into chain 3 extending downward to primary shaft 4; primary shaft 4 being driven by initial power exerted at pulley 5.

Primary shaft 4, drives secondary shaft 6, by means of sprockets and chains at 7. Attached to each end of secondary shaft 6, are crank arms 8, 8, which drive reciprocating rods 9, 9, which in turn are attached to candy hook B, the latter passing through and rigidly attached to sliding bearings 10, 10, the convex side of the candy hook facing downwardly. Uprights 1, 1, are made double above where shafts G G, pass through them, and bearings 10, 10 are grooved to fit in the spaces between the double uprights so as to slide evenly and smoothly upward and downward, as driven by reciprocating rods 9, 9, thus drawing candy hook B and chain 12 down close to, but not touching candy spool A, and then forcing candy hook and chain upward until it has reached the full length of the stroke of crank arms 8, 8.

Extending upward from sliding bearings 10, 10, are supports 11, 11, to which is attached the light chain 12, suspending the chain in an approximately vertical plane a few inches above hook B, and approximately parallel thereto, said chain moving in unison with hook B.

Following is a description of the operation of my improved candy pulling machine: Pulley 5 is rotated by belt attached to line shaft or other source of initial power, which turns primary shaft 4. By means of sprockets 2, and chain 3, candy spool A is rotated preferably approximately 100 times a minute. By means of chain and sprockets 7, secondary shaft 6, is rotated preferably approximately 12 times per minute, causing candy hook B to move upward and downward in a plane approximately vertical and parallel to plane of the axis of candy spool A. I place one end of a batch of candy to be pulled against revolving candy spool A, which quickly winds the candy into an approximately round and comparatively large coil. The reciprocating candy hook B, approaches candy spool A, cutting into the coil of candy. The plastic candy is forced above and over the candy hook and as it moves away the candy is pulled into a string. When candy hook B, is close to candy spool A, sometimes the candy is forced over the candy hook too fast. This is prevented by chain 12, the outward surface of the candy striking near the middle of the chain and forcing it outwardly in the direction in which the candy is moving, retarding movement of the candy over the hook and thus securing a more even pull. When candy hook B, and chain 12, reach the limit of the upward stroke they again approach candy spool A, this operation being repeated until the candy is pulled.

The candy spool A exerts a continuous pulling action and candy hook B, exerts an intermittent pulling action. The perpendicular pull is better than a horizontal pull, for the reason that gravity cannot cause the candy to sag in the center when stretched out. The length the candy is actually pulled out must not be calculated by length of the stroke made by candy hook B, for the reason candy spool A, exerts a constant pulling action in the same direction and the string of candy between spool and hook is drawn thinner and thinner until the hook strikes the coil of candy preparatory to another upward movement, the string of candy being wound into a coil instead of stretched at length.

I make specific mention of the fact that spool ends D, D, tend to prevent the candy being forced outwardly along shafts G, G, and the extension of ends of sections C, C, tends to divert to the center of the spool any candy forced outwardly over spool ends D, D. Also, the diameter of spool A, being least at the center E, and the coil of candy being relatively large at one point in the operation, the spool is inclined to turn faster than the bulk of the candy, especially at the time the hook commences to cut into the coil in the downward movement, which produces a twisting action that removes any candy inclined to harden and remain in the spool. If sections C C, were placed straight across the spool, instead of curved inwardly, it is evident that this twisting action would be materially reduced.

My invention is different from other candy pulling machines in that there is no figure 8 movement of the candy, an established basic principle, clearly set forth in specifications of U. S. Patent Number 831,501, page 2, line 20, issued to Herbert M. Dickinson September 18, 1906. Also, machines having intertwining or interlocking pulling hooks or pins produce a pull and lap of the candy, pulling the candy at length and folding together sections of more or less length.

I claim—

1. The combination, in a candy pulling machine, of a rotary candy spool, having a shaft serving as an axis, upon which are mounted at suitable distance apart two disks, serving as spool ends, said spool ends supporting at equal distance around their periphery, two or more longitudinally disposed sections of comparatively small diameter, all rigidly held and shaped to somewhat resemble the outer surface of a common spool, which when rotated winds upon itself a strand of candy placed thereon into an approximately round coil, substantially as described.

2. The combination, in a candy pulling machine, of a rotary candy spool, having a shaft serving as an axis, upon which are mounted at suitable distance apart two disks, serving as spool ends, said spool ends supporting at equal distance around their periphery, two or more longitudinally disposed sections of comparatively small diameter, all rigidly held and shaped to somewhat resemble the outer surface of a common spool, which when rotated winds upon itself the candy placed thereon into an approximately round coil; and a candy hook alternately approaching said candy spool and receding therefrom in such a manner as to cut into the candy coiled thereon as it approaches and as it recedes, to engage and pull away a portion of the candy.

3. The combination, in a candy pulling machine, of a rotary candy spool, having for its ends two disks, the periphery of said disks carrying longitudinally disposed sections of comparatively small diameter curved inwardly at their center, the ends of said sections extending outwardly past said disks in a longitudinal direction, all rigidly held and shaped to somewhat resemble the outer surface of a common spool, which when rotated winds upon itself candy placed thereon into an approximately round coil; a candy hook alternately approaching said candy spool and receding therefrom in such a manner as to cut into the candy coiled thereon as it approaches and as it recedes, to engage and pull away a portion of the candy; said candy hook being supplemented by a relatively light member suspended a short distance away from said candy hook, in a plane approximately parallel thereto and moving in unison therewith.

4. The combination, in a candy pulling machine of a rotary candy spool, having for its ends two disks, the periphery of said disks carrying longitudinally disposed sections of comparatively small diameter curved inwardly at their center, the ends of said sections extending outwardly past said disks in a longitudinal direction, all rigidly held and shaped to somewhat resemble the outer surface of a common spool, which when rotated winds upon itself a strand of candy placed thereon into an approximately round coil, and means for rotating same.

5. In a candy pulling machine, the combination of a coiling member, which when rotated winds upon itself candy placed thereon into an approximately round coil; a pulling member alternately approaching and receding from said coiling member supplemented by a relatively light member suspended a short distance away therefrom in a plane approximately parallel thereto and traveling in unison therewith, substantially as described.

HARVEY P. SPENCER.

Copies of this patent may be obtained for five cents each, by addressing the "Commissioner of Patents, Washington, D. C."